(12) United States Patent
Kemp

(10) Patent No.: US 8,001,176 B2
(45) Date of Patent: Aug. 16, 2011

(54) WEB SERVICE WITH MULTIPLE LISTENING ENDPOINTS

(75) Inventor: Devon James Kemp, Laguna Hills, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1447 days.

(21) Appl. No.: 11/249,407

(22) Filed: Oct. 14, 2005

(65) Prior Publication Data

US 2007/0086430 A1    Apr. 19, 2007

(51) Int. Cl.
G06F 15/16    (2006.01)
(52) U.S. Cl. ........ 709/203; 709/204; 709/205; 709/206; 709/231; 709/238
(58) Field of Classification Search .......... 709/203–206, 709/231, 238, 239; 370/401; 358/1.15
See application file for complete search history.

(56) References Cited

U.S. PATENT DOCUMENTS

| | | | | |
|---|---|---|---|---|
| 7,190,476 B2 * | 3/2007 | Berkema et al. | ............. | 358/1.15 |
| 7,251,689 B2 * | 7/2007 | Wesley | .......................... | 709/224 |
| 7,349,980 B1 * | 3/2008 | Darugar et al. | ............... | 709/238 |
| 7,490,153 B1 * | 2/2009 | Krishnan et al. | ............. | 709/226 |
| 2002/0184306 A1 * | 12/2002 | Simpson et al. | ............. | 709/203 |
| 2003/0002071 A1 * | 1/2003 | Berkema et al. | ............. | 358/1.15 |
| 2003/0110242 A1 * | 6/2003 | Brown et al. | .................. | 709/222 |
| 2003/0204645 A1 | 10/2003 | Sharma et al. | ................ | 719/328 |
| 2004/0111533 A1 * | 6/2004 | Beisiegel et al. | ............. | 709/246 |
| 2005/0096960 A1 * | 5/2005 | Plutowski et al. | ................ | 705/8 |
| 2005/0097221 A1 * | 5/2005 | James | .......................... | 709/239 |
| 2005/0138065 A1 * | 6/2005 | Ciriza | ....................... | 707/104.1 |
| 2005/0198200 A1 * | 9/2005 | Subramanian et al. | ....... | 709/218 |
| 2005/0198206 A1 * | 9/2005 | Miller et al. | .................. | 709/219 |
| 2005/0278396 A1 * | 12/2005 | Betts et al. | .................... | 707/203 |
| 2006/0041647 A1 * | 2/2006 | Perham et al. | ................ | 709/220 |
| 2006/0069777 A1 * | 3/2006 | Kato et al. | .................... | 709/225 |
| 2009/0144364 A1 * | 6/2009 | Krishnan et al. | ............. | 709/203 |

OTHER PUBLICATIONS

Increase Your App's Reach Using WSDL to Combine Multiple Web Services, Gerrard Lindsay, (Mar. 2005), <http://msdn.microsoft.com/msdnmag/issues/05/03/WSDL/default.aspx>.
Building Web Services With Java: SOAP, Steve Graham, et al., (May 10, 2002), <http://www.samspublishing.com/articles/article.asp?p=26666&seqNum=13>.
Beyond Soap: Optimized Web Services, Howard D'Souza, (Dec. 16, 2002), <http://webservices.sys-con.com/read/39646_p.htm>.
The TCP/IP Guide, Charles M. Kozierok, (Jun. 7, 2004), <http://www.tcpipguide.com/free/t_FTPDataConnectionManagementNormalActiveandPassiveD-2.htm>.
RE: proposal for restricting a service to a single interface, Kenneth Chiu,(Apr. 24, 2003), <http://lists.w3.org/Archives/Public/www-ws-desc/2003Apr/0091.htm>.

* cited by examiner

*Primary Examiner* — Joe H. Cheng
*Assistant Examiner* — Khaled Kassim
(74) *Attorney, Agent, or Firm* — Fitzpatrick, Cella, Harper & Scinto

(57) ABSTRACT

The invention concerns a device, method, and program for exposing one or more Web Services via a Web Service access protocol. Each Web Service comprises multiple Web Service actions for accessing the functionality of a device. The Web Service access protocol allows the exchange of information in a decentralized, distributed environment and encompasses multiple Web Service actions and multiple different communication protocols. Each listening endpoint exposes a grouping of Web Service actions, such that a first endpoint exposes a first grouping of actions and a second endpoint exposes a second grouping of actions. Each request handler handles requests at a respective endpoint, and each request handler is specifically configured to handle requests received at that endpoint. Because the invention can handle requests encompassing each message type differently, it can achieve improved performance when handling any message type.

27 Claims, 9 Drawing Sheets

WEB SERVICE WITH MULTIPLE LISTENING ENDPOINTS

BACKGROUND OF THE INVENTION

1. Field of the Invention

The invention concerns devices connected to a network that expose functionality through one or more Web Services accessible via a Web Service access protocol. More particularly, the invention concerns a network printer exposing print functionality through a Print Web Service accessible via the Simple Object Access Protocol (SOAP). The Print Web Service provides multiple listening endpoints and uses the endpoint targeted in an incoming SOAP message as a hint to determine the message type of the incoming message even before handling the SOAP message so that the Web Service can be specifically configured to handle each SOAP message type in possibly different ways to achieve improved performance.

2. Description of the Related Art

The advent of standardized Web Service access protocols has allowed computing devices to expose functionality over decentralized, distributed networking environments. One such Web Service access protocol is the Simple Object Access Protocol (SOAP). SOAP encompasses multiple Web Service actions and multiple different communication protocols. Some examples of communication protocols capable of transmitting SOAP messages include Hypertext Transfer Protocol (HTTP), Simple Mail Transfer Protocol (SMTP), Post Office Protocol (POP), Internet Message Access Protocol (IMAP), Multipurpose Internet Mail Extensions (MIME), Simple MIME Exchange Protocol (SMXP), Blocks Extensible Exchange Protocol (BEEP), File Transfer Protocol (FTP), IBM MQSeries, Microsoft Message Queue (MSMQ), and Java Messaging Service (JMS).

Currently, devices exposing one or more Web Services via a Web Service access protocol listen to a single listening endpoint to receive requests for all Web Service actions. Since requests for different Web Service actions may utilize different underlying communication protocols, the listening endpoint must handle all supported communication protocols. Furthermore these requests are contained in SOAP messages, and devices cannot identify the requested Web Service action before decoding the SOAP message. As a consequence, the listening endpoint is written generically to handle all supported communication protocols and all supported Web Service actions. Therefore, this generic listening endpoint is unable to achieve improved performance when handling all requests.

The invention recognizes that, if only a single SOAP message type encompassing a distinct grouping of Web Service actions and a distinct set of communication protocols is expected at a particular listening endpoint, then the listening endpoint can be. specifically configured to handle that SOAP message type. Thus, the Web Service can achieve improved performance when handling a SOAP message type with a specific set of handling requirements.

SUMMARY OF THE INVENTION

The present invention addresses the foregoing by providing a Web Service with multiple listening endpoints, such that each endpoint listens for a single SOAP message type encompassing a distinct grouping of Web Service actions and a distinct set of communication protocols. The endpoint on which an incoming message is received provides a hint as to the type of request being made, such that even before decoding the SOAP message, the Web Service can identify the requested Web Service handler based on the listening endpoint that received the message. In this manner, the Web Service action can be specifically configured to handle each message type differently to achieve improved performance.

Accordingly, the invention concerns a device connectable to a network and exposing one or more Web Services via a Web Service access protocol, methods performed by such a device, a method for configuring the device, and a program stored on a computer-readable medium for performing these methods. The device comprises one or more Web Services, a Web Service access protocol, and multiple listening endpoints, each listening endpoint coupled with a corresponding request handler. The method comprises a configuration step to configure each listening endpoint, a listening step at each listening endpoint, and a handling step at each listening endpoint. The program comprises process steps executable to perform the method.

Each Web Service comprises multiple Web Service actions for accessing the functionality of the device. The Web Service access protocol allows the exchange of information in a decentralized, distributed environment and encompasses multiple Web Service actions and multiple different communication protocols. Each listening endpoint exposes a grouping of Web Service actions, such that a first listening endpoint exposes a first grouping of Web Service actions and a second listening endpoint exposes a second grouping of Web Service actions. Each request handler handles requests at a respective one of the multiple listening endpoints, and each request handler is specifically configured to handle requests received at that listening endpoint.

In one preferred embodiment, the device is a printer including a Print Web Service. The Web Service access protocol is preferably SOAP and the different communication protocols preferably include Hypertext Transfer Protocol (HTTP), Simple Mail Transfer Protocol (SMTP), Post Office Protocol (POP), Internet Message Access Protocol (IMAP), Multipurpose Internet Mail Extensions (MIME), Simple MIME Exchange Protocol (SMXP), Blocks Extensible Exchange Protocol (BEEP), File Transfer Protocol (FTP), IBM MQSeries, Microsoft Message Queue (MSMQ), and Java Messaging Service (JMS). A first listening endpoint preferably exposes actions for managing the printer and a second listening endpoint preferably exposes actions for submitting data to the printer.

The device preferably comprises a single Internet Protocol (IP) address. Preferably, each listening endpoint comprises an IP address and a Transmission Control Protocol (TCP) port number, such that the IP address of each listening endpoint is the same and each TCP port number is different.

Preferably, each request handler is specifically configured to handle a single SOAP message type encompassing a distinct grouping of Web Service actions and a distinct set of communication protocols. Preferably, each request handler stores an incoming message in a storage medium, then decodes the message, and finally executes the requested Web Service action. Different storage media preferably include a memory card, a memory chip, a memory storage device, and a disk drive. Preferably, a storage medium can be located on the device or on a network. In the preferred embodiment, the device comprises multiple storage media, and each storage medium located on the device has a limited storage capacity.

In the preferred embodiment, for the request handler specifically configured to handle requests for actions for managing the printer, this request handler uses a faster storage medium with a lesser storage capacity and a high priority process thread; whereas for the request handler specifically configured to handle requests for actions for submitting data to the printer, this request handler uses a slower storage medium with a greater storage capacity and a low priority process thread.

By virtue of the foregoing, the invention allows a device exposing one or more Web Services to identify the nature of the requested Web Service action before decoding the SOAP message. Therefore, unlike current devices that cannot identify the requested Web Service action before decoding the SOAP message, the service for each listening endpoint can be specifically configured to handle each SOAP message type differently. This ability allows the invention to achieve performance advantages over current devices. For example, for a printer exposing a Print Web Service, a request to submit data to the printer may encompass a message type that includes multiple megabytes of data encoded in a MIME structure, whereas a request to execute an action that manages the printer could encompass a message type that includes a small message transmitted via HTTP. A printer specifically configured for handling MIME messages may utilize a slow storage medium with a high capacity, whereas a printer specifically configured for handling HTTP messages may utilize a fast storage medium with a low capacity. Therefore, if the printer must handle all messages in the same manner and is specifically configured to handle MIME messages, it may not achieve improved performance when handling HTTP messages. Thus, because the service for each listening endpoint can be specifically configured to handle each SOAP message type differently, the invention can achieve performance advantages over current devices.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
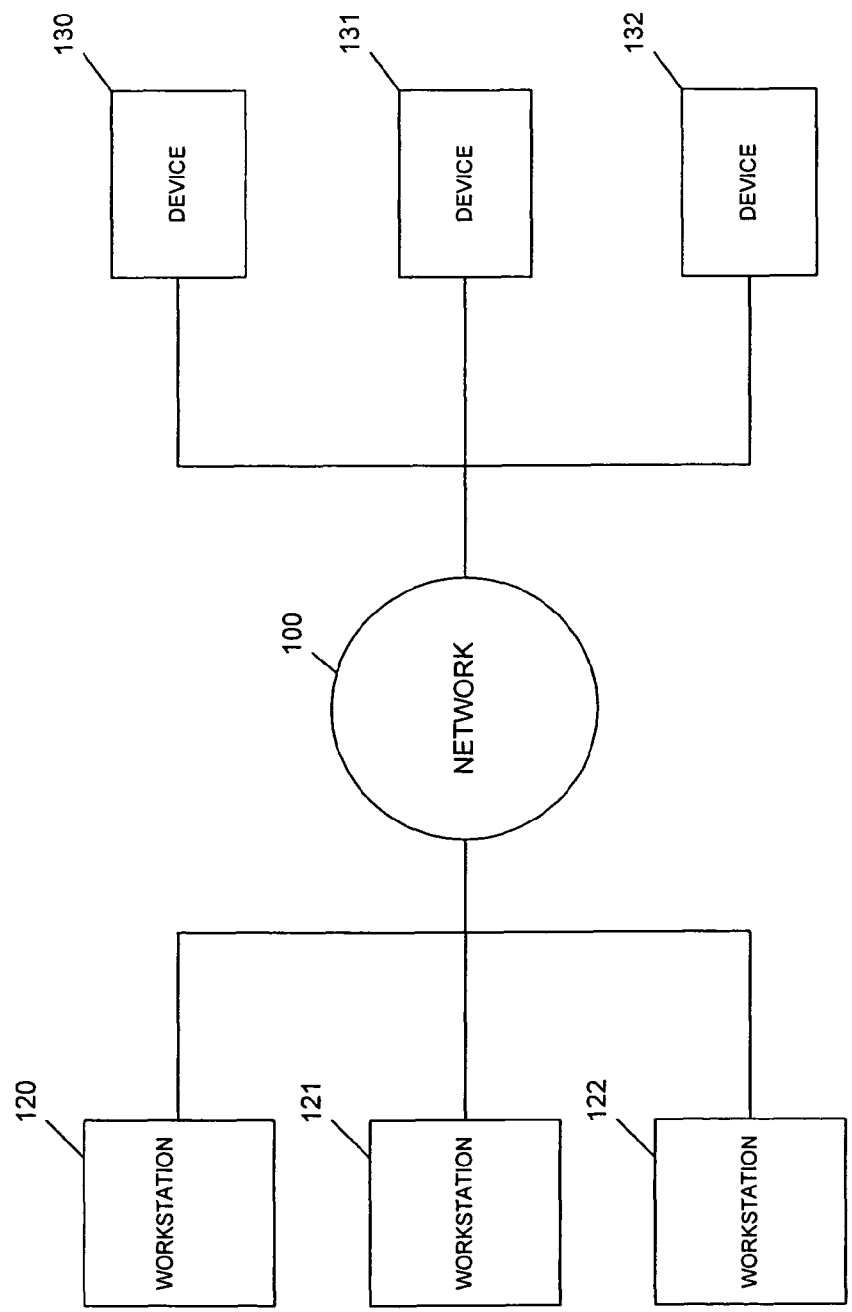
FIG. 1 depicts an example of a network environment in which a first embodiment of the invention may be deployed.

FIG. 1 depicts an example of a network environment in which a first embodiment of the invention may be deployed. Network 100 is preferably a local area network (LAN), but may be any other type of network which carries communications according to a Web Service access protocol. Network 100 may include various computing components such as workstations, printers, servers, etc. that communicate with one another over network infrastructure. Network infrastructure may include various communication devices such as routers and data communication hubs that provide a communication link between the various components connected to the network, as well as communication with other networks such as the Internet. Network 100 preferably includes multiple client workstations, such as workstations 120 to 122, and multiple network devices, such as devices 130 to 132. Each of the client workstations is preferably capable of communicating with at least one of devices 130 to 132. Each of the components shown in FIG. 1 are merely representative of some components that may be included in a network environment and, of course, numerous other components may also be connected to the network. However, for brevity, the description of the invention will be limited to use with those components shown in FIG. 1.

Workstation 120 is preferably a computer employing an operating system. Workstations 121 and 122 may be similar to workstation 120 and therefore, the following description applies equally for these workstations. Workstation 120 preferably includes a mass storage device such as a hard disk for storing data files and application files. As stated above, workstation 120 preferably employs an operating system which would be stored on the hard disk. From workstation 120, a user can perform various operations utilizing application programs stored on the disk. These operations include communicating with any of devices 130 to 132 connected to network 100.

Devices 130 to 132 are connected to network 100 for users to be able to communicate with them. Devices 130 to 132 preferably include an operating system. Devices 130 to 132 are preferably network enabled devices that include an Ethernet network interface card for communicating with workstations 120 to 122. An Ethernet cable connects the Ethernet network interface card to network 100. An Internet Protocol (IP) address associated with the Ethernet network interface card identifies the device on network 100. Devices 130 to 132 may be any type of network enabled device and need not be any particular type of device.

Figure 2:
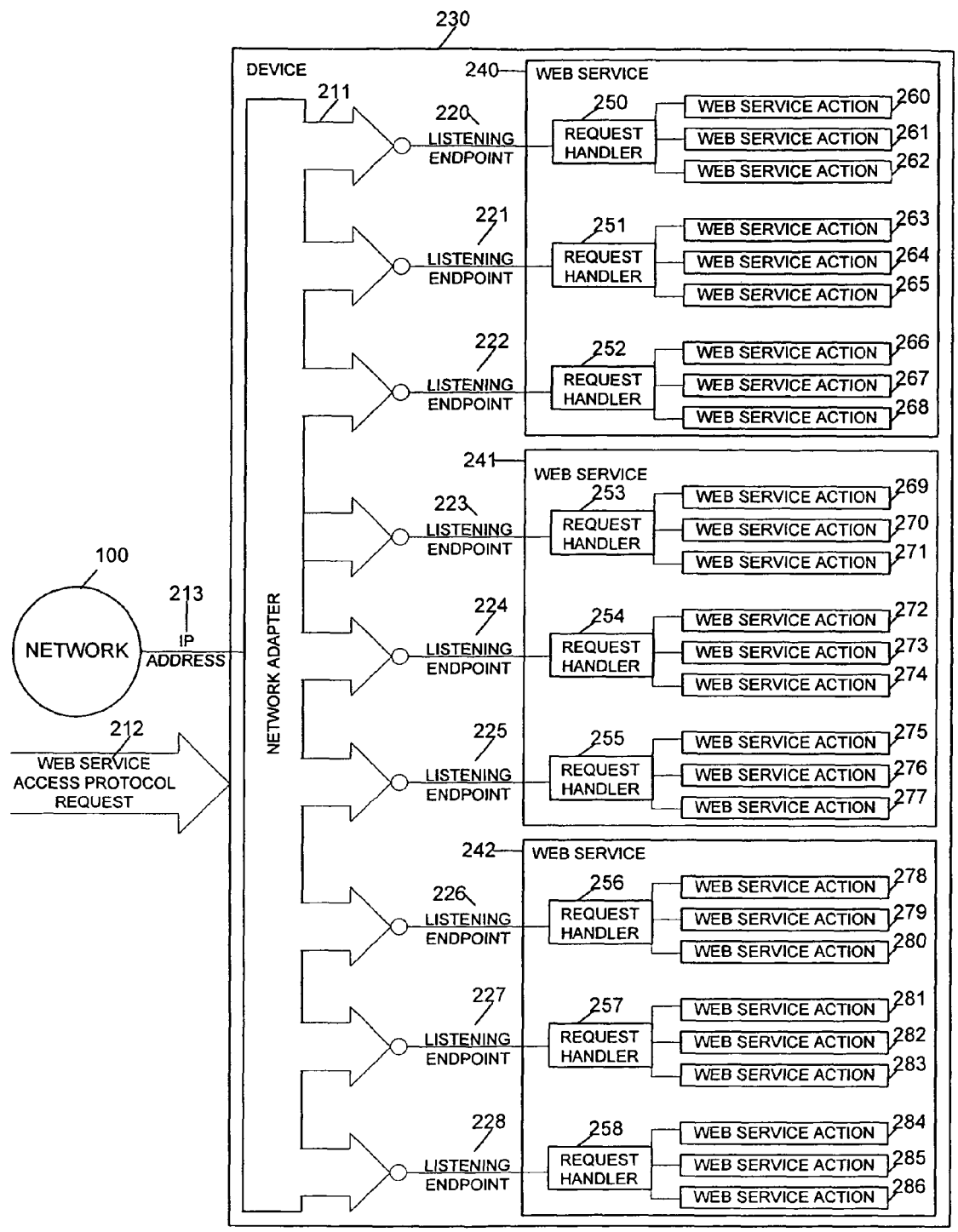
FIG. 2 depicts an example of a logical configuration of processes in the first embodiment of the invention.

FIG. 2 depicts an example of a logical configuration of processes in the first embodiment of the invention. Device 230 is a network enabled device preferably including multiple Web Services such as Web Services 240 to 242. Network adapter 211 is the network protocol implementation included with the device's operating system. Network adapter 211 handles requests received by the device through Ethernet network interface card 420 (see FIG. 4). IP address 213 is the IP address associated with Ethernet network interface card 420 (see FIG. 4). Web Service access protocol request 212 includes an IP address identifying a device, a listening endpoint identifier identifying a process within the device, and an identifier identifying an action for the process to execute.

Web Services 240 to 242 are accessible via a Web Service access protocol. Each of Web Services 240 to 242 preferably includes multiple Web Service actions, such as Web Service actions 260 to 286, for accessing the functionality of the device. Web Services 240 to 242 preferably include multiple request handlers, such as request handlers 250 to 258, for handling requests to execute Web Service actions 260 to 286. Device 230 preferably includes multiple listening endpoints, such as listening endpoints 220 to 228, for exposing Web Service actions 260 to 286 via network 100 of FIG. 1. Listening endpoints 220 to 228 receive Web Service access protocol requests to execute Web Service actions 260 to 286, such as Web Service access protocol request 212.

Figure 3:
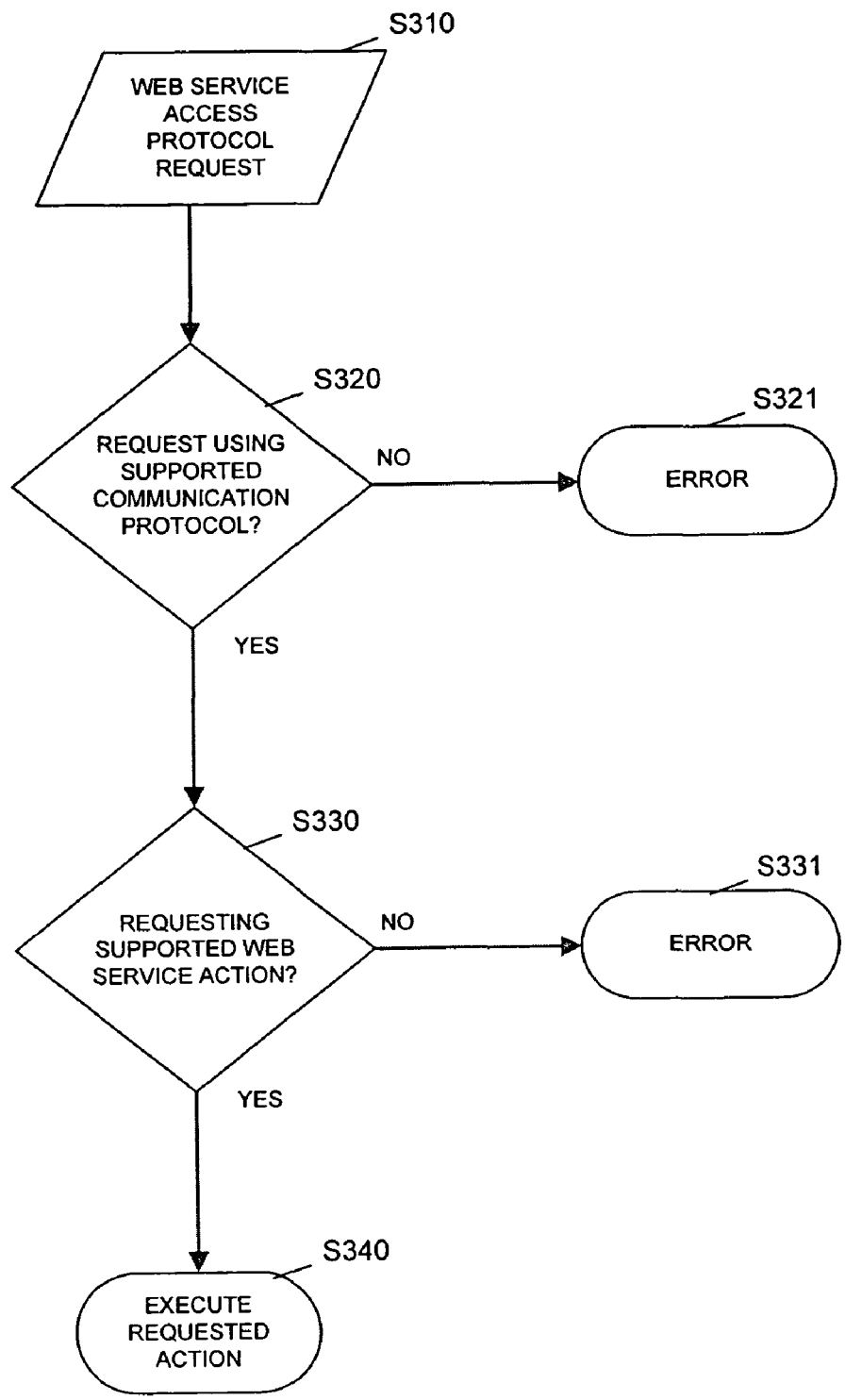
FIG. 3 is a flowchart of process steps for request handlers 250 to 258 as depicted in FIG. 2.

FIG. 3 is a flowchart of process steps for request handlers 250 to 258 as depicted in FIG. 2. In step S310, the request handler receives a Web Service access protocol request addressed to one of listening endpoints 220 to 228 of FIG. 2. In step S320, the request handler determines whether the request is using a communication protocol supported by the targeted listening endpoint. If the request is using a supported communication protocol, the request handler proceeds to step S330 where it determines whether the requested Web Service action is a supported Web Service action. If the request handler supports the requested Web Service action, then the request handler proceeds to step S340 and executes the Web Service action. If the request is not using a supported communication protocol, then the request handler proceeds to step S321 and executes an error handling action. If the requested Web Service action is not a supported Web Service action, then the request handler proceeds to step S331 and executes an error handling action.

Figure 4:
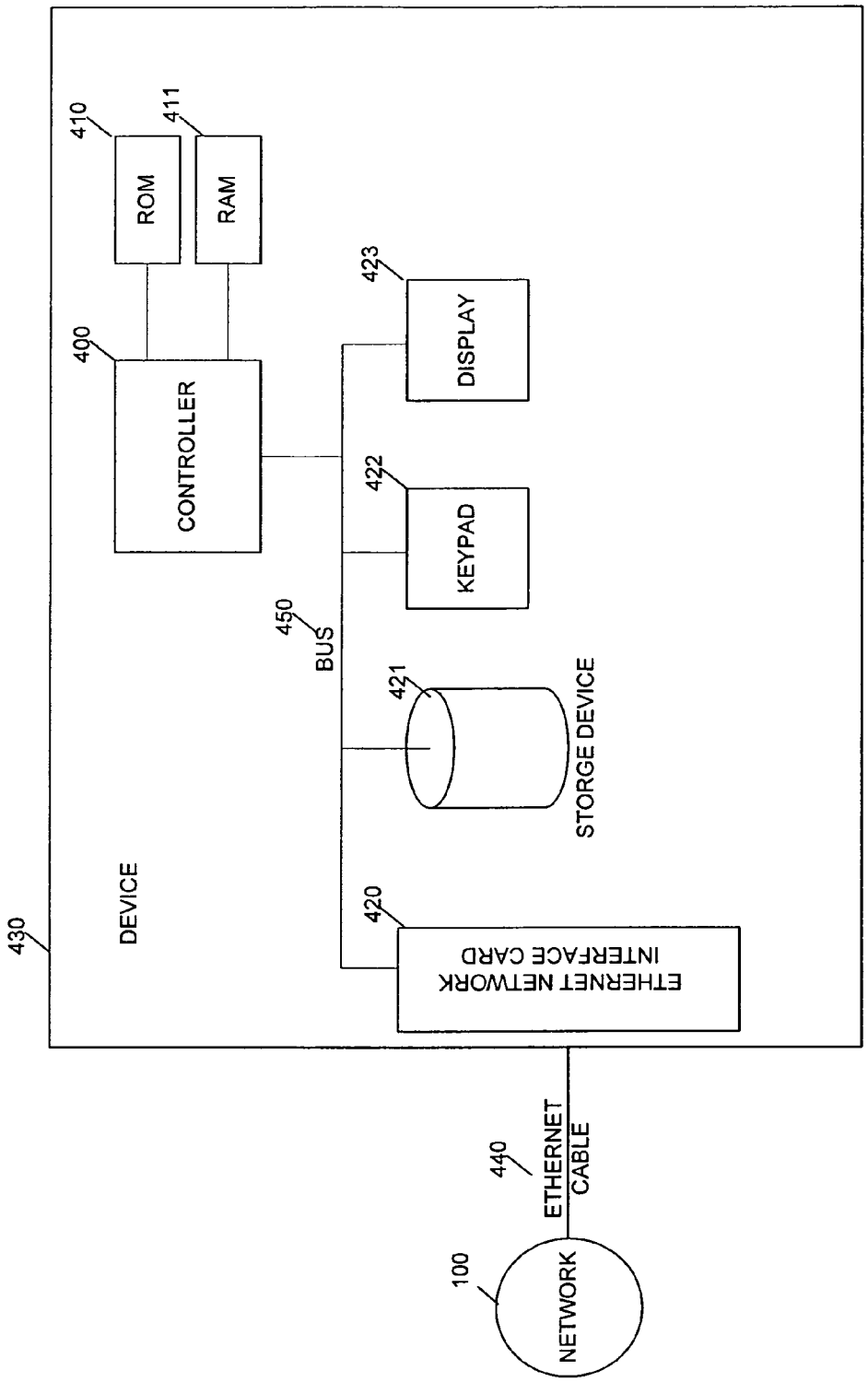
FIG. 4 depicts an example internal architecture of a device in the first embodiment of the invention.

FIG. 4 depicts an example internal architecture of a device in the first embodiment of the invention. Device 430 is a network enabled device. Controller 400 is a microprocessor interfaced to bus 450. Also coupled to bus 450 are Ethernet network interface card 420, storage device 421, keypad 422, and display 423. Storage device 421 stores the printer's operating system and the computer-executable process steps comprising Web Services 240 to 242 of FIG. 2. RAM 411 is a random access memory interfaced to controller 400. ROM 410 is a read only memory interfaced to controller 400. Ethernet cable 440 connects Ethernet network interface card 420 to network 100 of FIG. 1. Ethernet network interface card 420 is associated with IP address 213 of FIG. 2.

From workstations 120 to 122 of FIG. 1, a user can perform various operations utilizing application programs stored on the disk. These operations include communicating with any of devices 130 to 132 connected to network 100. From workstations 120 to 122 of FIG. 1, a user wanting to communicate with one of devices 130 to 132 of FIG. 1 to execute a Web Service action performs a process within an application program that generates a Web Service access protocol request, such as Web Service access protocol request 212 of FIG. 2. This Web Service access protocol request includes an IP address identifying the device that the user wants to communicate with, a listening endpoint identifier identifying the request handler associated with the requested Web Service action, and an identifier identifying the requested Web Service action. The application program residing on the workstation then transmits the Web Service access protocol request to the device.

Web Service access protocol requests including the IP address associated with the device's Ethernet network interface card may be received by the device. Web Service access protocol requests including a listening endpoint identifier may be received by the corresponding request handler. Upon receipt of a request, request handlers 250 to 258 of FIG. 2 execute computer-executable process steps as described in FIG. 3 and either execute the requested Web Service action or execute an error handling action.

Figure 5:
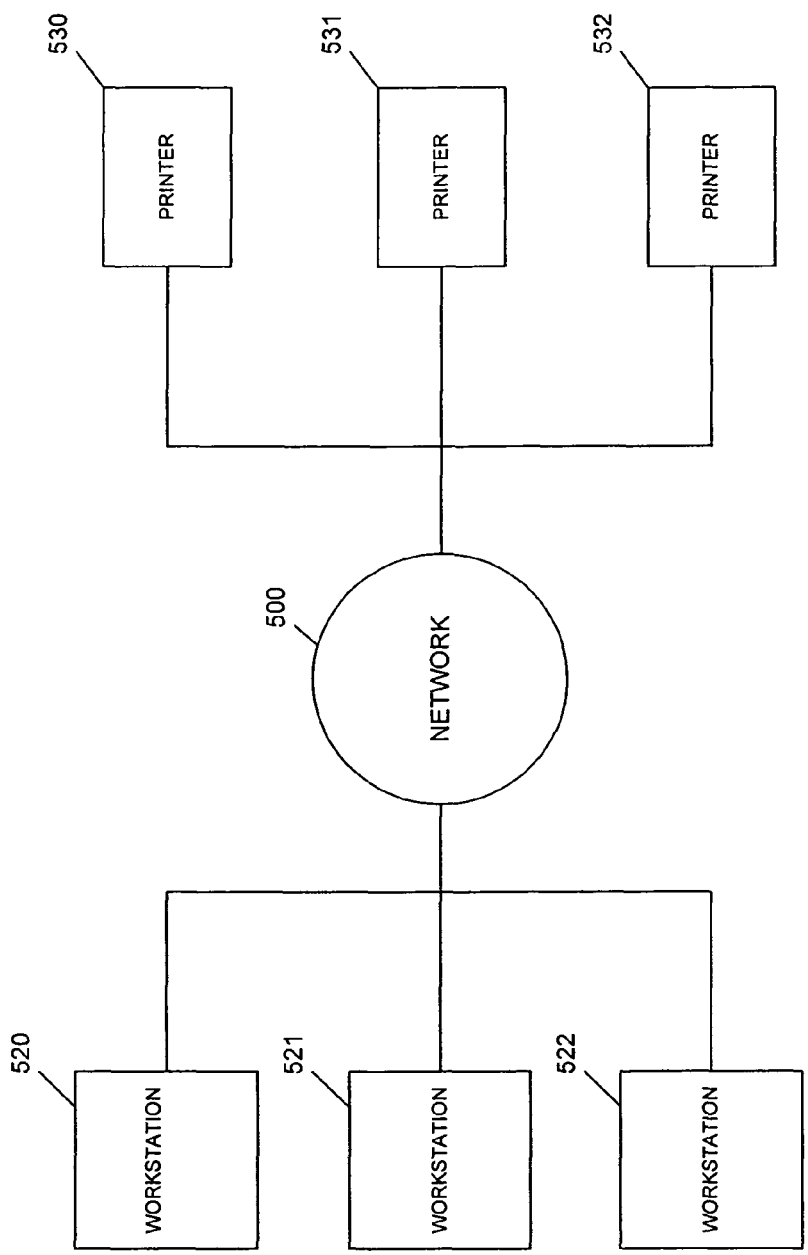
FIG. 5 depicts an example of a network environment in which a second embodiment of the invention may be deployed.

FIG. 5 depicts an example of a network environment in which a second embodiment of the invention may be deployed. Workstations 520 to 522 may be similar to workstations 120 to 122 of FIG. 1 and therefore, the preceding description of workstations 120 to 122 of FIG. 1 applies equally to workstations 520 to 522. Network 500 may be similar to network 100 of FIG. 1 and therefore, the preceding description of network 100 of FIG. 1 applies equally to network 500.

Printers 530 to 532 are connected to network 500 for users to be able to communicate with them. Printers 530 to 532 preferably include an operating system. Printers 530 to 532 are preferably network enabled printers that include an Ethernet network interface card for communicating with workstations 520 to 522. An Ethernet cable connects the Ethernet network interface card to network 500. An Internet Protocol (IP) address associated with the Ethernet network interface card identifies the printer on network 500. Printers 530 to 532 may be any type of network enabled printer and need not be any particular type of printer.

Figure 6:
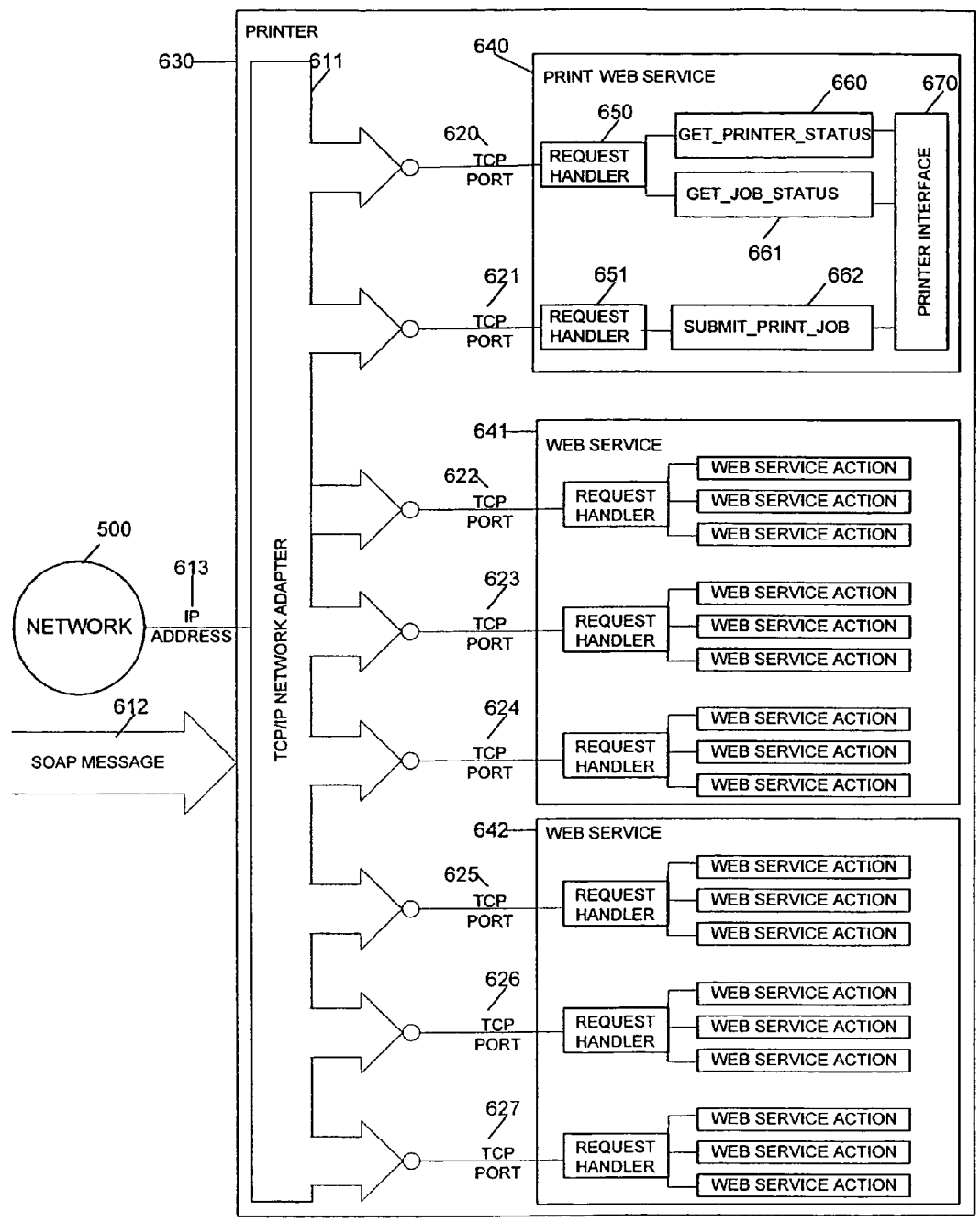
FIG. 6 depicts an example of a logical configuration of processes in the second embodiment of the invention.

FIG. 6 depicts an example of a logical configuration of processes in the second embodiment of the invention. Printer 630 is a network printer preferably including multiple Web Services such as Print Web Service 640 and Web Services 641 and 642. TCP/IP network adapter 611 is the Transmission Control Protocol (TCP)/IP protocol implementation included with the printer's operating system. TCP/IP network adapter 611 handles requests received by the printer through Ethernet network interface card 920 of FIG. 9. IP address 613 is the IP address associated with Ethernet network interface card 920 of FIG. 9. SOAP message 612 includes an IP address identifying a printer, a TCP port number identifying a process within the printer, and an identifier identifying an action for the process to execute.

Print Web Service 640 is a Web Service accessible via SOAP. Print Web Service 640 includes Web Service actions Get_Printer_Status 660 for getting the status of the printer, Get_Job_Status 661 for getting the status of a print job, and Submit_Print_Job 662 for submitting a print job to the printer. Print Web Service 640 includes request handler 650 for handling requests for Web Service actions Get_Printer_Status 660 and Submit_Print_Job 662 and request handler 651 for handling requests for Web Service action Submit_Print_Job 662. Request handler 650 uses a high priority process thread and a fast, small capacity storage medium such as RAM 911 of FIG. 9. Request handler 651 uses a low priority process thread and a slow, large capacity storage medium such as storage device 921 of FIG. 9. Request handler 650 handles requests addressed to TCP port 620. Request handler 651 handles requests addressed to TCP port 621. Print Web Service 640 also includes printer interface 670 for interfacing with the printer controller.

Web Service 641 receives requests addressed to TCP ports 622 to 624 and Web Service 642 receives requests addressed to TCP ports 625 to 627. Web Services 641 and 642 may be similar to Web Services 240 to 242 of FIG. 2. Therefore, the preceding description of Web Services 240 to 242 of FIG. 2 and the corresponding flowchart of FIG. 3 apply equally to Web Services 641 and 642.

Although the embodiments of FIGS. 2 and 6 are both depicted as hosting multiple Web Services, the invention should be understood to encompass embodiments which host even a single Web Service.

Figure 7:
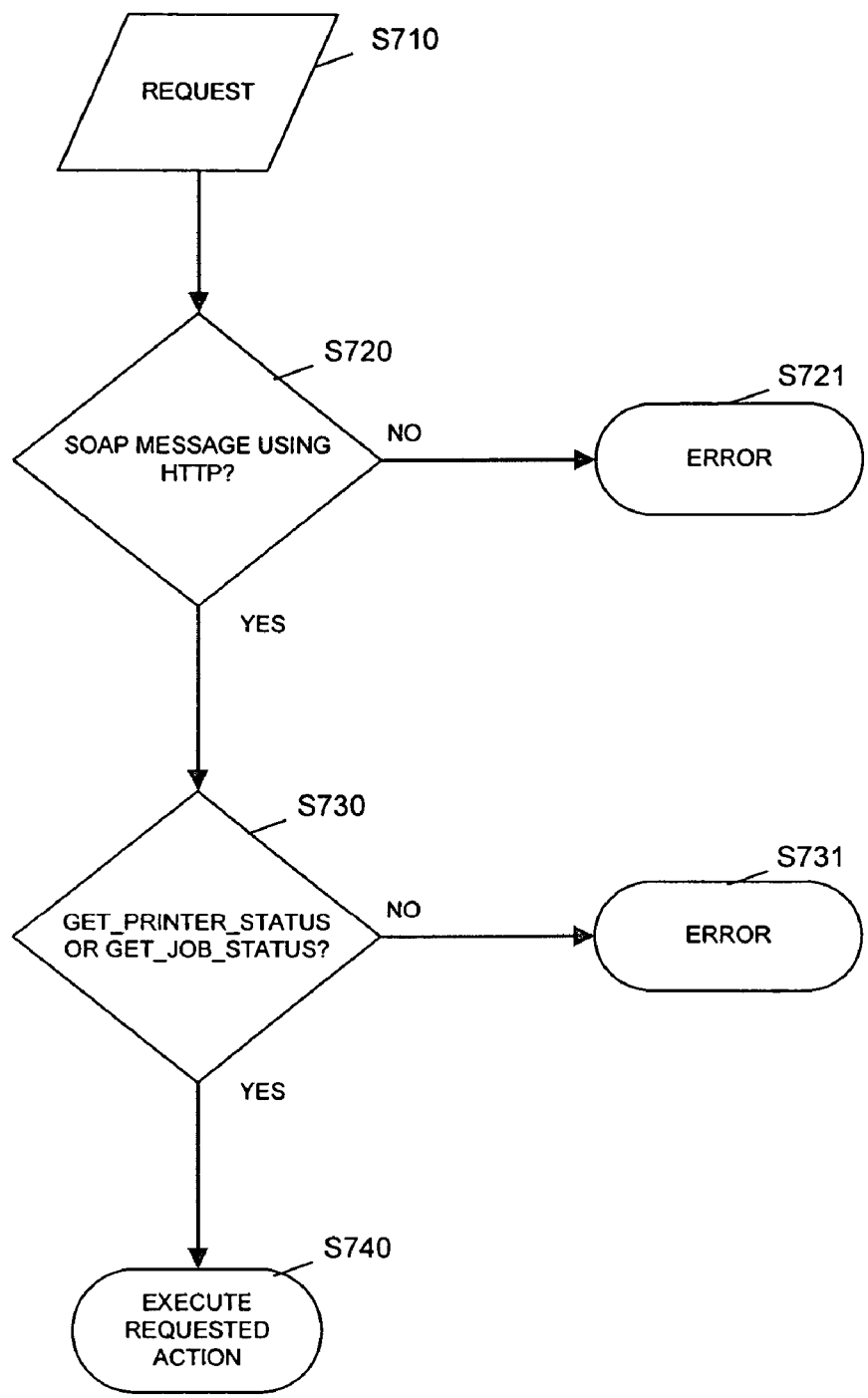
FIG. 7 is a flowchart of process steps for request handler 650 as depicted in FIG. 6.

FIG. 7 is a flowchart of process steps for request handler 650 as depicted in FIG. 6. In step S710, the request handler receives a request addressed to TCP port 620 of FIG. 6. In step S720, the request handler determines whether the request is a SOAP message transmitted using HTTP. If the request is a SOAP message transmitted using HTTP, the request handler proceeds to step S730 where it determines whether the requested Web Service action is either Get_Printer_Status or Get_Job_Status. If the requested Web Service action is either Get_Printer_Status or Get_Job_Status, then the request handler proceeds to step S740 and executes the requested Web Service action. If the request is not a SOAP message transmitted using HTTP, then the request handler proceeds to step S721 and executes an error handling action. If the requested Web Service action is neither Get_Printer_Status nor Get_Job_Status, then the request handler proceeds to step S731 and executes an error handling action.

Figure 8:
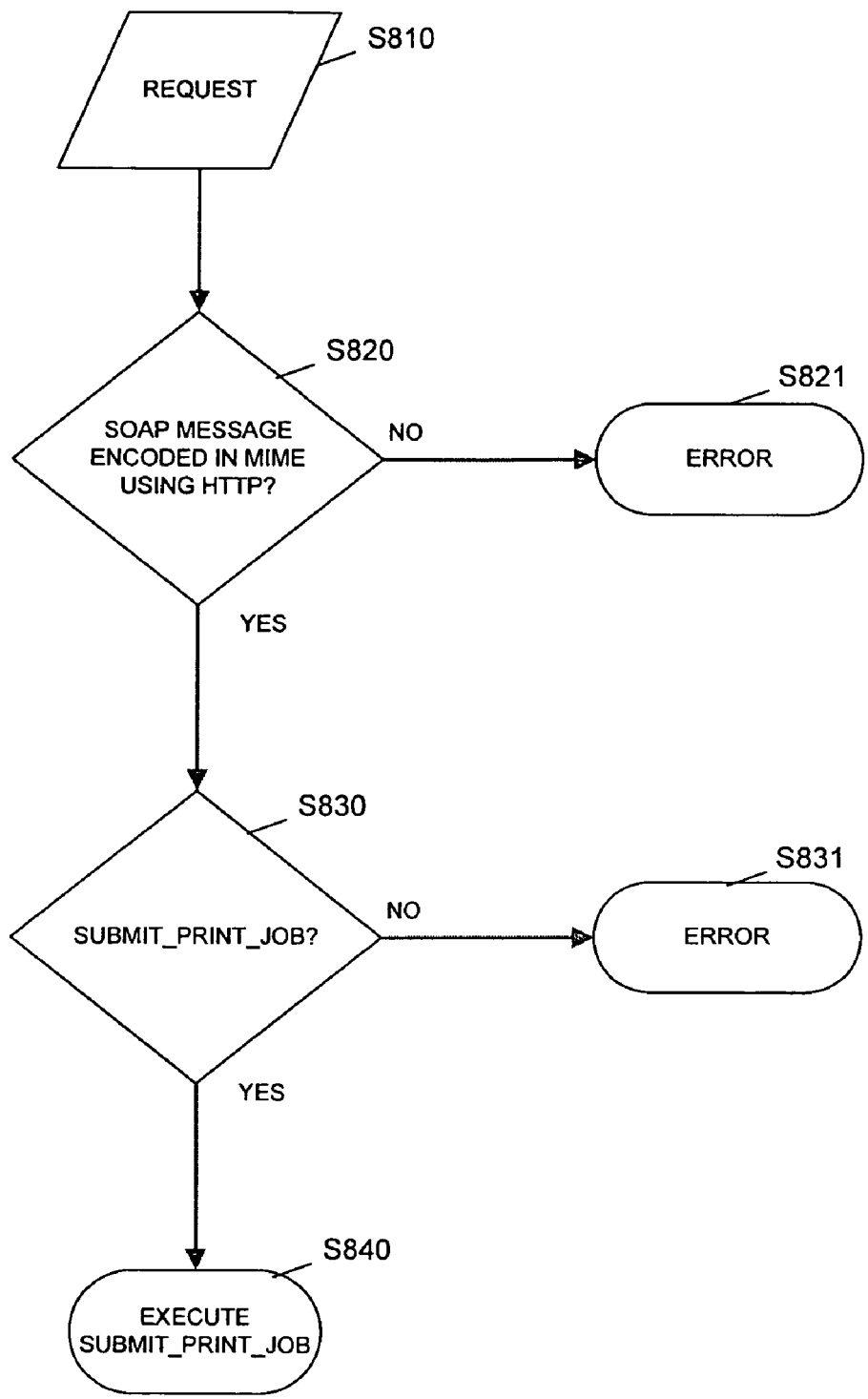
FIG. 8 is a flowchart of process steps for request handler 651 as depicted in FIG. 6.

FIG. 8 is a flowchart of process steps for request handler 651 as depicted in FIG. 6. In step S810, the request handler receives a request addressed to TCP port 621 of FIG. 6. In step S820, the request handler determines whether the request is a SOAP message encoded in MIME and transmitted using HTTP. If the request is a SOAP message encoded in MIME and transmitted using HTTP, the request handler proceeds to step S830 where it determines whether the requested Web Service action is Submit_Print_Job. If the requested Web Service action is Submit_Print_Job, then the request handler proceeds to step S840 and executes the Submit_Print_Job Web Service action. If the request is not a SOAP message encoded in MIME and transmitted using HTTP, then the request handler proceeds to step S821 and executes an error handling action. If the requested Web Service action is not Submit_Print_Job, then the request handler proceeds to step S831 and executes an error handling action.

Figure 9:
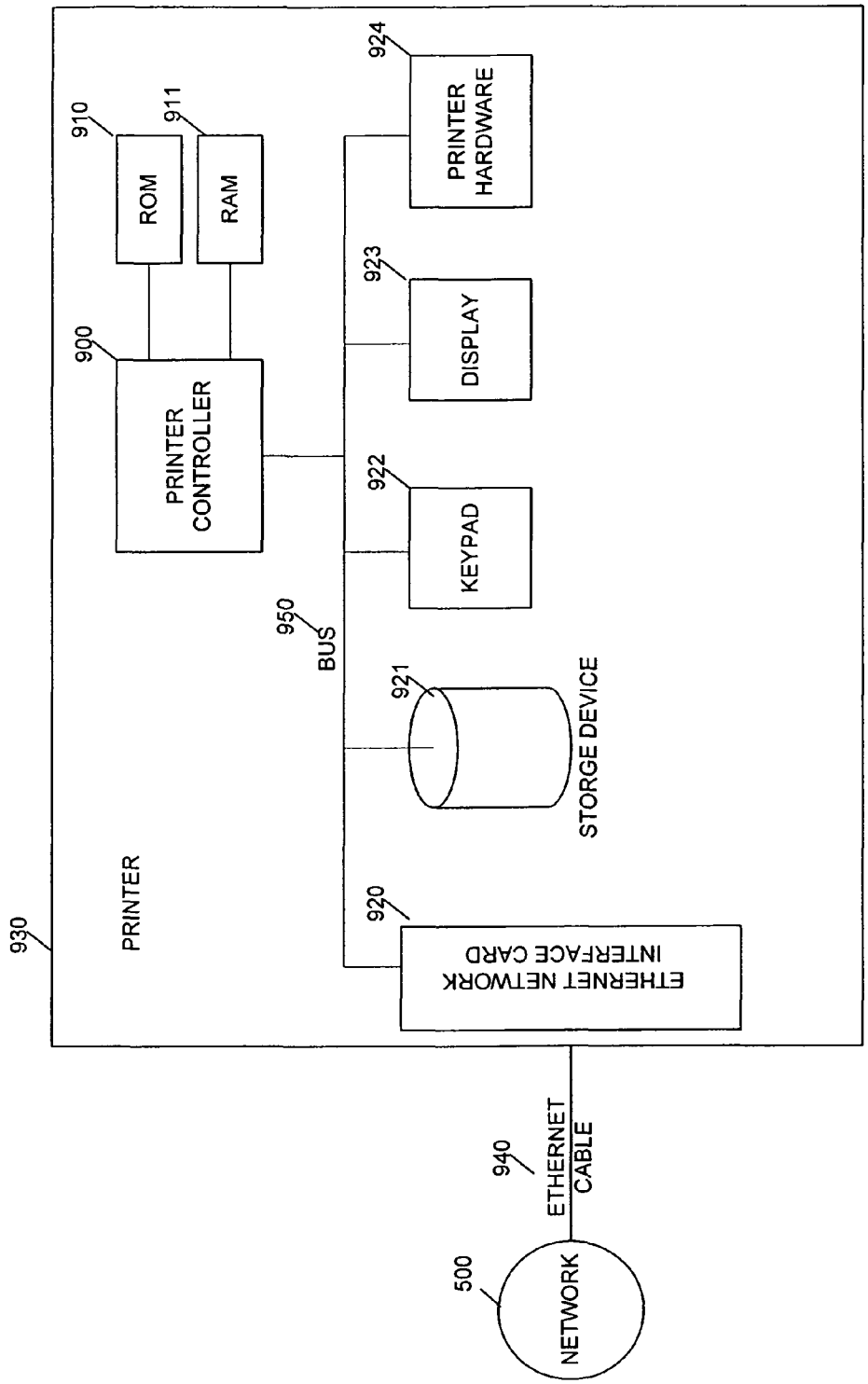
FIG. 9 depicts an example internal architecture of a network printer in the second embodiment of the invention.

FIG. 9 depicts an example internal architecture of a network printer in the second embodiment of the invention. Printer 930 is a network printer. Printer controller 900 is a microprocessor interfaced to bus 950. Also coupled to bus 950 are Ethernet network interface card 920, storage device 921, keypad 922, display 923, and printer hardware 924. Storage device 921 stores the printer's operating system and the computer-executable process steps comprising Print Web Service 640 and Web Services 641 and 642 of FIG. 6. RAM 911 is a random access memory interfaced to printer controller 900. ROM 910 is a read only memory interfaced to printer controller 900. Ethernet cable 940 connects Ethernet network interface card 920 to network 500 of FIG. 5. Ethernet network interface card 920 is associated with IP address 613 of FIG. 6.

From workstations 520 to 522 of FIG. 5, a user can perform various operations utilizing application programs stored on the disk. These operations include communicating with any of printers 530 to 532 connected to network 500 for requesting the status of the printer, requesting the status of a print job, or submitting a print job.

From workstations 520 to 522 of FIG. 5, a user wanting to communicate with one of printers 530 to 532 of FIG. 5 to execute a Print Web Service action performs a process within an application program that generates a SOAP message, such as SOAP message 612 of FIG. 6. This SOAP message includes an IP address identifying the printer that the user wants to communicate with, a TCP port number identifying the request handler associated with the requested Web Service action, and an identifier identifying the requested Web Service action. The application program residing on the workstation then transmits the SOAP message to the printer using a network communication protocol such as HTTP or SMTP.

SOAP messages including the IP address associated with the printer's Ethernet network interface card may be received by the printer. TCP/IP network adapter 611 of FIG. 6 directs SOAP messages received by the printer to the particular request handler identified by the TCP port number included with the SOAP message. Upon receipt of a request, request handler 650 and request handler 651 of FIG. 6 execute computer-executable process steps as described in FIGS. 7 and 8 respectively and either execute the requested Web Service action or execute an error handling action.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A device connected to a network and exposing a Web Service via a Web Service access protocol, comprising:
    a Web Service comprising multiple Web Service actions for accessing functionality of the device;
    a network adapter for receiving a Web Service access protocol request including an identifier which identifies one of the Web Service actions for execution by a process hosted by the device;
    multiple listening endpoints for receiving the Web Service access protocol request received by the network adapter, including a first listening endpoint Corresponding to a first grouping of web Service actions and a second listening endpoint corresponding to a second grouping of Web service actions; and
    multiple request handlers for handling a request to execute one of the Web Service actions, including a first request handler corresponding to the first listening endpoint and a second request handler corresponding to the second listening endpoint,
    wherein the request handlers receive a Web Service access protocol request from a corresponding listening endpoints, determine whether the request uses a communication protocol supported by the corresponding listening endpoint, determine whether the requested Web Service action is supported by a Web Service action in a corresponding grouping of Web Service actions, and execute the requested Web Service action responsive to a determination that it is supported; and wherein each request handler is specifically configured to handle a single SOAP message type encompassing a distinct grouping of Web Service actions and a distinct set of communication protocols.

2. The device according to claim 1, wherein the device is a printer connected to a network exposing a Print Web Service via the Simple Object Access Protocol (SOAP), such that a first listening endpoint exposes actions for managing the printer and a second listening endpoint exposes actions for submitting data to the printer.

3. The device according to claim 2, wherein the web service access protocol comprises a protocol for exchanging information in a decentralized environment that encompasses multiple web service actions and multiple different communication protocols, the different communication protocols include Hypertext Transfer Protocol (HTTP), Simple Mail Transfer Protocol (SMTP), Post Office Protocol (POP), Internet Message Access Protocol (IMAP), Multipurpose Internet Mail Extensions (MIME), Simple MIME Exchange Protocol (SMXP), Blocks Extensible Exchange Protocol (BEEP), File Transfer Protocol (FTP), IBM MQSeries, Microsoft Message Queue (MSMQ), and Java Messaging Service (JMS).

4. The device according to claim 2, wherein the request handler specifically configured to handle requests for actions for managing the printer uses a faster storage medium with a lesser storage capacity and the request handler specifically configured to handle requests for actions for submitting data to the printer uses a slower storage medium with a greater storage capacity.

5. The device according to claim 2, wherein the request handler specifically configured to handle requests for actions for managing the printer uses a high priority process thread and the request handler specifically configured to handle requests for actions for submitting data to the printer uses a low priority process thread.

6. The device according to claim 1, wherein the device comprises a single Internet Protocol address.

7. The device according to claim 1, wherein each listening endpoint comprises an Internet Protocol address and a Transmission Control Protocol port number.

8. The device according to claim 7, wherein the Internet Protocol address of each listening endpoint is the same and each Transmission Control Protocol port number is different.

9. The device according to claim 1, wherein each request handler stores an incoming message in a storage medium, then decodes the message, and finally executes the requested Web Service action.

10. The device according to claim 9, wherein different storage media include a memory card, a memory chip, a memory storage device, and a disk drive.

11. The device according to claim 9, wherein a storage medium can be located on the device or on a network.

12. The device according to claim 11, wherein each storage medium located on the device has a limited storage capacity.

13. The device according to claim 1, wherein the device comprises multiple storage media.

14. A method for configuring a device connected to a network, wherein the device exposes a Web Service via a Web Service access protocol, wherein the Web Service comprises multiple Web Service actions for accessing functionality of the device, the method comprising:
a configuration step (a) to configure a network adapter of the device for receiving a Web Service access protocol request including an identifier which identifies one of the Web Service actions for execution by a process hosted by the device, (b) to configure multiple listening endpoints of the device for receiving the Web Service access protocol received by the network adapter, including a first listening endpoint corresponding to a first grouping of Web Service actions and a second listening endpoint corresponding to a second grouping of Web Service actions; and (c) to configure multiple request handlers of the device for handling a request to execute one of the Web Service actions, including a first request handler corresponding to the first listening endpoint and a second request handler corresponding to the second listening endpoint;
a listening step to listen for an incoming Web Service access protocol request at the network adapter; and
a handling step in which the request handlers receive the Web Service access protocol request from the corresponding listening endpoints, determine whether the request uses a communication protocol supported by the corresponding listening endpoint, determine whether the requested Web Service action is supported by a Web Service action is supported by a Web Service action in a corresponding grouping of Web Service actions, and execute the requested Web Service action responsive to a determination that it is supported; and wherein each request is handled by a request handler specifically configured to handle a single SOAP message type encompassing a distinct grouping of Web Service actions and a distinct set of communication protocols.

15. The method according to claim 14, wherein the device is a printer connected to a network exposing a Print Web Service via the Simple Object Access Protocol (SOAP), such that a first listening endpoint exposes actions for managing the printer and a second listening endpoint exposes actions for submitting data to the printer.

16. The method according to claim 15, wherein the web service access protocol for exchanging information in a decentralized, distributed environment that encompasses multiple web service actions and multiple different communication protocols, the different communication protocols include Hypertext Transfer Protocol (HTTP), Simple Mail Transfer Protocol (SMTP), Post Office Protocol (POP), Internet Message Access Protocol (IMAP), Multipurpose Internet Mail Extensions (MIME), Simple MIME Exchange Protocol (SMXP), Blocks Extensible Exchange Protocol (BEEP), File Transfer Protocol (FTP), IBM MQSeries, Microsoft Message Queue (MSMQ), and Java Messaging Service (JMS).

17. The method according to claim 15, wherein the request handler specifically configured to handle requests for actions for managing the printer uses a faster storage medium with a lesser storage capacity and the request handler specifically configured to handle requests for actions for submitting data to the printer uses a slower storage medium with a greater storage capacity.

18. The method according to claim 15, wherein the request handler specifically configured to handle requests for actions for managing the printer uses a high priority process thread and the request handler specifically configured to handle requests for actions for submitting data to the printer uses a low priority process thread.

19. The method according to claim 14, wherein the device comprises a single Internet Protocol address.

20. The method according to claim 14, wherein each listening endpoint comprises an Internet Protocol address and a Transmission Control Protocol port number.

21. The method according to claim 20, wherein the Internet Protocol address of each listening endpoint is the same and each Transmission Control Protocol port number is different.

22. The method according to claim 14, wherein each request handler stores an incoming message in a storage medium, then decodes the message, and finally executes the requested Web Service action.

23. The method according to claim 22, wherein different storage media include a memory card, a memory chip, a memory storage device, and a disk drive.

24. The method according to claim 22, wherein a storage medium can be located on the device or on a network.

25. The method according to claim 24, wherein each storage medium located on the device has a limited storage capacity.

26. The method according to claim 14, wherein the device comprises multiple storage media.

27. A program stored on a non-transitory computer-readable medium, said program for configuring a device connected to a network for exposing Web Services via a Web Service access protocol comprising process steps executable to perform a method according to claim 14.

* * * * *